US009071838B2

United States Patent
Cho et al.

(10) Patent No.: US 9,071,838 B2
(45) Date of Patent: Jun. 30, 2015

(54) IMAGE DATA COMPRESSING AND DECOMPRESSING METHODS AND DISPLAY DRIVING DEVICE USING THE SAME

(75) Inventors: Hwa Hyun Cho, Seoul (KR); Sang-Woo Kim, Seoul (KR); Yong-Yeob Choi, Seoul (KR); YoonKyung Choi, Yongin-si (KR); Jaesuk Yu, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 718 days.

(21) Appl. No.: 13/242,249

(22) Filed: Sep. 23, 2011

(65) Prior Publication Data

US 2012/0120043 A1   May 17, 2012

(30) Foreign Application Priority Data

Nov. 16, 2010   (KR) .......................... 10-2010-0114027

(51) Int. Cl.

| G06K 9/36 | (2006.01) |
| G06F 3/038 | (2013.01) |
| H04N 19/12 | (2014.01) |
| G09G 3/20 | (2006.01) |
| H04N 19/15 | (2014.01) |
| H04N 19/90 | (2014.01) |

(52) U.S. Cl.
CPC ............ *H04N 19/12* (2014.11); *G09G 3/2092* (2013.01); *G09G 2330/021* (2013.01); *G09G 2340/02* (2013.01); *H04N 19/15* (2014.11); *H04N 19/90* (2014.11)

(58) Field of Classification Search
CPC ...... G06F 3/038; G06K 9/36; H04N 7/26069; H04N 7/26962; H04N 7/2618
USPC ............. 375/240.01, 240.03, 240.27; 341/50; 348/222.1, 448; 382/110
See application file for complete search history.

(56) References Cited

U.S. PATENT DOCUMENTS 7,912,304 B2   3/2011   Furihata et al.
8,422,550 B2 *  4/2013   Li ............................. 375/240.01
(Continued)

FOREIGN PATENT DOCUMENTS

CN   1878311   12/2006
CN   101087415   12/2007
(Continued)

*Primary Examiner* — Y Lee
*Assistant Examiner* — Salame Amr
(74) *Attorney, Agent, or Firm* — Onello & Mello, LLP.

(57) ABSTRACT

Disclosed is a display driving device, a display device including the same, and an image data compression and decompression method. The display driving device comprises an encoder that compresses PenTile® matrix encoded input image data using a binary encoding scheme and a DPCM encoding scheme, calculates errors produced by each encoding scheme, and selects an encoding scheme mode and its compressed data according to the calculated errors. A decoder decompresses the compressed data according to a decoding scheme corresponding to the selected encoding scheme mode. And a source driver drives source lines connected with a display panel based on decompressed data.

13 Claims, 11 Drawing Sheets

(56) References Cited

U.S. PATENT DOCUMENTS

| | | |
|---|---|---|
| 2004/0141635 A1* | 7/2004 | Liang et al. ................ 382/110 |
| 2005/0046702 A1* | 3/2005 | Katayama et al. ......... 348/222.1 |
| 2005/0206785 A1* | 9/2005 | Swan et al. ................ 348/448 |
| 2006/0018378 A1* | 1/2006 | Piccinelli et al. ........ 375/240.03 |
| 2007/0013561 A1* | 1/2007 | Xu et al. .................... 341/50 |
| 2008/0175489 A1 | 7/2008 | Lee et al. |
| 2009/0322713 A1 | 12/2009 | Furihata et al. |
| 2011/0148844 A1 | 6/2011 | Furihata et al. |

FOREIGN PATENT DOCUMENTS

| | | |
|---|---|---|
| EP | 1615447 | 1/2006 |
| JP | 2008-178108 | 7/2008 |
| JP | 2008-224796 | 9/2008 |
| JP | 2010-11386 | 1/2010 |
| KR | 10-2008-0068473 | 7/2008 |

* cited by examiner

Fig. 5

| MODE (3bit) | P_R (3bit) | A_R (8bit) | B_R (8bit) | P_G (7bit) | A_G (8bit) | B_G (8bit) | P_B (3bit) | A_B (8bit) | B_B (8bit) |
|---|---|---|---|---|---|---|---|---|---|
| 111 | 000 | 0000 1010 | 0001 0100 | 010 0101 | 0000 1010 | 0001 0100 | 000 | 0001 0100 | 0000 1010 |

IMAGE DATA COMPRESSING AND DECOMPRESSING METHODS AND DISPLAY DRIVING DEVICE USING THE SAME

CROSS-REFERENCE TO RELATED APPLICATIONS

This application claims the benefits, under 35 U.S.C. §119, of Korean Patent Application No. 10-2010-0114027 filed Nov. 16, 2010, the entirety of which is incorporated by reference herein.

BACKGROUND

1. Field

The inventive concepts relate to a display driving device and image data compression and decompression methods thereof, and more particularly, relate to a display driving device including a memory and image data compression and decompression methods thereof.

2. Description of the Related Art

There have been developed flat panel display devices with less weight and volume than conventional cathode ray tube displays and monitors. Such flat panel display devices may include plasma display panel (PDP) devices, liquid crystal display (LCD) devices, field emission display devices, organic light emitting display devices, and the like. Display driving circuits may receive image information from a host, such as a graphics card. Display driving circuits convert image information into image data to be provided to the flat panel display.

With increases in the resolution of flat panel display devices, the memory usage of display driving circuits is increased, since there is a greater amount of display data to be processed with higher resolution graphics. This will typically cause an increase in power consumption. Further, increases in memory usage may cause an increase in the number and length of lines connected to the memory. As a result, display driving circuits used with higher resolution flat panel displays may experience interference between signals and voltage drops, which cause malfunctions in such higher resolution flat panel displays.

SUMMARY

According to various aspects of the present inventive concepts, provided is an image data compression and decompression method, and a display driving device that uses the same. Benefits of the foregoing can include reduced power consumption and reduced interference between source line signals, which can be achieved by reducing memory usage.

One aspect of the inventive concept is directed to a display driving device comprising an encoder configured to calculate errors due to a binary encoding scheme and a differential pulse code modulation (DPCM) encoding scheme, respectively, with respect to input image data coded using PenTile matrix encoding to select one of the binary encoding scheme and the DPCM encoding scheme according to the calculated errors, and to output compressed data using the selected binary or DPCM encoding scheme. A decoder is configured to decompress the output compressed data using a decoding scheme corresponding to the selected encoding scheme to form decompressed data. And a source driver is configured to drive source lines coupled to a display panel based on the decompressed data. (PenTile® is a registered trademark owned by Samsung Electronics, Co. Ltd.)

The encoder can further comprise a macro block generator configured to generate macro blocks from the input image data, the macro blocks can comprise macro block units. The encoder can also include a first compression unit configured to compress the input image data by macro block unit using the binary encoding scheme to produce macro block units of binary compression data and a second compression unit configured to compress the input image data by macro block unit using the DPCM encoding scheme to produce macro block units of DPCM compression data.

The encoder can further comprise a first pre-decompression unit configured to decompress the macro block units of binary compression data using a binary decoding scheme, by macro block unit and a second pre-decompression unit configured to decompress the macro block units of DPCM compression data using a DPCM decoding scheme, by macro block unit. A first error calculation unit of the encoder can be configured to calculate a first error between the input image data and the data decompressed by the first pre-decompression unit and a second error calculation unit of the encoder can be configured to calculate a second error between the input image data and the data decompressed by the second pre-decompression unit. And a mode selection unit of the encoder can be configured to compare the first and second errors and, based thereon, to select one of the binary compression data and the DPCM compression data.

The encoder can further comprise a bit stream generator configured to generate a bit stream from the binary or the DPCM compression data selected by the mode selection unit and to output the bit stream as the compressed data.

The bit stream can comprise mode data indicating an encoding scheme of the binary or DPCM compression data selected by the mode selection unit.

The decoder can comprise a bit stream extractor configured to receive the bit stream and a mode judgment unit configured to determine a decoding scheme corresponding to the binary or DPCM compression data selected by the mode selection unit based on the mode data of the received bit stream.

The decoder can further comprise a first decompression unit and a second decompression unit configured to selectively operate in response to a determination result of the mode judgment unit. The first decompression unit can be configured to decompress the binary compression data by macro block unit using a binary decoding scheme in response to the determination result of the mode judgment unit. The second decompression unit can be configured to decompress the DPCM compression data by macro block unit using a DPCM decoding scheme in response to the determination result of the mode judgment unit.

The macro block generator can be configured to generate R, G, and B macro blocks, each of the R and B macro blocks can have a 2×2 size and the G macro blocks can have a 4×2 size.

The first compression unit can be configured to determine first and second representative values and a pattern based on each macro block and to compress sub-pixel values of each macro block using the first and second representative values and the pattern.

The second compression unit can be configured to calculate difference values between a reference sub-pixel value and remaining sub-pixel values of each macro block and to compress sub-pixel values of each macro block using the difference values.

In accordance with another aspect of the inventive concept, provided is an image data compression method of a display driving device. The method comprises generating macro blocks from input image data, the macro blocks comprising macro block units, compressing the macro blocks of input image data using a binary encoding scheme, by macro block unit; compressing the macro blocks of input image data using a DPCM encoding scheme, by a macro block unit; calculating first and second errors due to the binary encoding scheme and the DPCM encoding scheme, respectively; and selecting data compressed according to one of the binary encoding scheme and the DPCM encoding scheme based on the lesser of first error and the second error.

The macro blocks can include R, G, and B macro blocks, each of the R and B macro blocks can have a 2×2 size and the G macro blocks can have a 4×2 size.

Compressing the macro blocks of input image data in a binary encoding scheme by macro block unit can comprise determining first and second representative values representing sub-pixel values of each macro block, determining a pattern of each macro block based on the first and second representative values, and compressing sub-pixel values of each macro block using the first and second representative values and the pattern.

Determining the first and second representative values representing sub-pixel values of each macro block can comprise calculating an average value of the sub-pixels as a reference average value, calculating an average value of sub-pixel values equal to or more than the reference average value as an upper average value, calculating an average value of sub-pixel values less than the reference average value as a lower average value, and determining one of the upper and lower average values as the first representative value and the other as the second representative value, wherein the first representative value corresponds to a value of a reference sub-pixel for each macro block.

The image data compression method can further comprise associating a "1" or a "0" with the first representative value, associating the other of the "1" or the "0" with the second representative value, and determining the pattern to include ones and zeros representing corresponding first and second representative values.

Compressing the input image data in the DPCM encoding scheme by macro block unit can comprise calculating difference values between a reference sub-pixel value and remaining sub-pixel values of each macro block, and compressing sub-pixel values of each macro block using the difference values.

The image data compression method can further comprise generating a bit stream that includes mode data indicating the selected encoding scheme of the input image data and includes data compressed according to the selected encoding scheme of the input image data.

In accordance with still another aspect of the inventive concept, provided is an image data decompression method of a display driving device which comprises receiving a bit stream including mode data indicating one of a binary encoding scheme and a DPCM encoding scheme used to compress input image data and including macro blocks of compressed data corresponding to the mode data; selecting either one of a binary decoding scheme and a DPCM decoding scheme based on the mode data; decompressing the macro blocks of compressed data, by macro block unit, using the selected one of the binary decoding scheme and the DPCM decoding scheme.

Selecting one of the binary decoding scheme and the DPCM decoding scheme can comprise selectively switching between a binary decompression unit and a DPCM decompression unit.

The method can further comprise a mode judgment unit reading the mode data and controlling the switching between the binary decompression unit and the DPCM decompression unit.

The macro blocks can include R, G, and B macro blocks, each of the R and B macro blocks can have a 2×2 size and the G macro blocks can have a 4×2 size.

In accordance with still another aspect of the inventive concept, provided is a display device, comprising at least one display panel, a display driving device coupled to the at least on display panel, a decoder, and a source driver. The display driving device comprises an encoder configured to compress PenTile matrix coded input image data using a binary encoding scheme and a DPCM encoding scheme, to calculate resultant errors from each encoding scheme, to select one of the binary encoding scheme and the DPCM encoding scheme according to the calculated errors, and to output compressed data using the selected encoding scheme. The decoder is configured to decompress the output compressed data using a decoding scheme corresponding to the selected binary or DPCM encoding scheme to generate decompressed data. And the source driver is configured to drive source lines connected with the display panel based on the decompressed data.

The encoder can comprise a macro block generator configured to generate macro blocks from the input image data using PenTile matrix encoding, where the macro blocks comprise macro block units, a first compression unit configured to compress the input image data by macro block unit using the binary encoding scheme to produce macro block units of binary compression data, and a second compression unit configured to compress the input image data by macro block unit using the DPCM encoding scheme to produce macro block units of DPCM compression data.

The encoder can further comprise a first pre-decompression unit configured to decompress the binary compression data using a binary decoding scheme, by macro block unit, a second pre-decompression unit configured to decompress the DPCM compression data using a DPCM decoding scheme, by macro block unit, a first error calculation unit configured to calculate a first error between the input image data and the data decompressed by the first pre-decompression unit, a second error calculation unit configured to calculate a second error between the input image data and the data decompressed by the second pre-decompression unit, and a mode selection unit configured to compare the first and second errors and, based thereon, to select one of the binary compression data and a binary mode and the DPCM compression data and a DPCM mode.

The encoder can further comprise a bit stream generator configured to generate a bit stream from the binary or DPCM compression data selected by the mode selection unit and to output the bit stream as the compressed data.

The bit stream can comprise mode data indicating an encoding scheme of the binary or DPCM compression data selected by the mode selection unit.

The decoder can comprise a bit stream extractor configured to receive the bit stream and a mode judgment unit configured to determine a decoding scheme corresponding to the binary or DPCM compression data selected by the mode selection unit based on the mode data of the received bit stream.

The decoder can further comprise a first decompression unit and a second decompression unit configured to selectively operate in response to a determination result of the mode judgment unit. The first decompression unit can be configured to decompress the binary compression data by macro block unit using a binary decoding scheme when the determination result of the mode judgment unit indicates the binary mode. And the second decompression unit can be configured to decompress the DPCM compression data by macro block unit using a DPCM decoding scheme when the determination of the mode judgment unit indicates the DPCM mode.

The macro block generator can be configured to generate R, G, and B macro blocks, each of the R and B macro blocks can have a 2×2 size and the G macro blocks can have a 4×2 size.

The first compression unit can be configured to determine first and second representative values and a pattern of each macro block and to compress sub-pixel values of each macro block using the first and second representative values and the pattern.

The second compression unit can be configured to calculate difference values between a reference sub-pixel value and remaining sub-pixel values of each macro block and to compress sub-pixel values of each macro block using the difference values.

The display driving device can further comprise a gate driver having gate lines coupled to pixels of the display panel and a timing controller configured to receive vertical and horizontal sync signals and the input image data from a host, and to output source driving control signals to the source driver and gate driving control signals to the gate driver in response to the vertical and horizontal sync signals and to transmit the input image data to the encoder.

The encoder can form part of the timing controller.

In accordance with another aspect of the inventive concept, provided is a display driving device, comprising an encoder configured to compress PenTile matrix coded input image data using a plurality of different encoding schemes, to calculate errors from each of the different encoding schemes, and to output compressed data using only the encoding scheme having the fewest errors. The display driving device also includes a decoder configured to decompress the output compressed data to form decompressed data and a source driver configured to drive source lines connected with a display panel based on the decompressed data.

The different encoding schemes can include a binary encoding scheme and a DPCM encoding scheme.

The encoder can comprise a macro block generator configured to generate macro blocks of PenTile matrix coded image data from input image data, the macro blocks comprising macro block units. The encoder can also include a plurality of compression units, each compression unit configured to compress the macro block units using a different encoding scheme to produce macro block units of compression data.

The encoder can further comprise a plurality of pre-decompression units, each pre-decompression unit coupled to a corresponding compression unit and configured to decompress the macro block units of compression data provided by the corresponding compression unit, by macro block unit, a plurality of error calculation units, each error calculation unit coupled to a corresponding pre-decompression unit and configured to calculate an error between the input image data and the data decompressed by the corresponding pre-decompression unit, and a mode selection unit configured to compare the errors from the plurality of error calculation units and, based thereon, to select a mode corresponding to an encoding scheme producing the fewest errors.

The encoder can further comprise a bit stream generator configured to generate a bit stream from the compression data corresponding to the selected mode and to output the bit stream as the output compressed data.

The bit stream can comprise mode data indicating the selected mode.

The decoder can comprise a bit stream extractor configured to receive the bit stream and a mode judgment unit configured to determine a decoding scheme corresponding to the selected mode based on the mode data of the received bit stream.

The decoder can further comprise a plurality of decompression units, each decompression unit configured to selectively operate in response to a determination result of the mode judgment unit, wherein each decompression unit is configured to decompress compression data produced by a corresponding one of the plurality of compression units, by macro block unit.

The macro block generator can be configured to generate R, G, and B macro blocks, each of the R and B macro blocks having a 2×2 size and the G macro blocks having a 4×2 size from the input image data.

At least one compression unit can be configured to determine first and second representative values and a pattern of each macro block and to compress sub-pixel values of each macro block using the first and second representative values and the pattern.

At least one compression unit can be configured to calculate difference values between a reference sub-pixel value and remaining sub-pixel values of each macro block and to compress sub-pixel values of each macro block using the difference values.

BRIEF DESCRIPTION OF THE FIGURES

The inventive concept or concepts will become apparent from the following description with reference to the following figures, wherein like reference numerals refer to like parts throughout the various figures unless otherwise specified, and wherein:

FIG. 5 is a diagram showing an exemplary embodiment of a bit stream corresponding to macro blocks illustrated in FIG. 4, according to aspects of the inventive concept.

DETAILED DESCRIPTION

Figure 1:
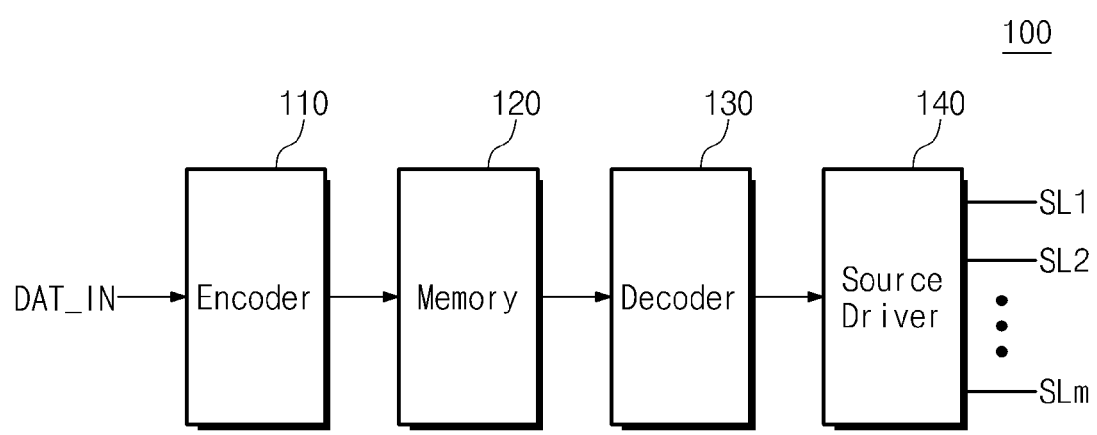
FIG. 1 is a block diagram showing an exemplary embodiment of portions of a display driving device, according to aspects of the inventive concept.

Aspects of the inventive concept are described more fully hereinafter with reference to the accompanying drawings, in which exemplary embodiments in accordance therewith are shown. This inventive concept or concepts may, however, be embodied in many different forms and should not be construed as limited to the embodiments set forth herein. In the drawings, the sizes and relative sizes of elements may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept or concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary relative terms "below" and "under" can encompass both an orientation of above and below. The device may be otherwise oriented (e.g., rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept or concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram showing an exemplary embodiment of a portion of a display driving device, according to aspects of the inventive concept. Referring to the embodiment of FIG. 1, a display driving device 100 includes an encoder 110, a memory 120, a decoder 130, and a source driver 140.

The encoder 110 compresses input image data DAT_IN using any one of a plurality of encoding schemes. For example, the encoder 110 may operate based upon a binary encoding scheme and a differential pulse code modulation (DPCM) encoding scheme. The encoder 110 calculates errors resulting from each of the above-described encoding schemes and selects the encoding scheme causing fewer errors for image processing. The binary encoding scheme will be more fully described with reference to FIGS. 4 and 5, and the DPCM encoding scheme will be more fully described with reference to FIG. 6.

The memory 120 stores data compressed by the encoder 110. That is, the memory 120 stores data compressed using the binary encoding scheme and/or using the DPCM encoding scheme, in this embodiment. The memory 120 transmits the compressed data to the decoder 130, or stores the compressed data for access by the decoder 130.

The decoder 130 decompresses the compressed data using a corresponding one of a plurality of decoding schemes. That is, the decoder 130 decompresses compressed data from encoder 110 using a decoding scheme corresponding to the encoding scheme selected by encoder 110. For example, the decoder 130 can perform decompression using the binary decoding scheme with respect to data compressed using the binary encoding scheme (hereinafter, referred to as 'binary compression data'). Alternatively, the decoder 130 performs decompression using the DPCM decoding scheme with respect to data compressed using the DPCM encoding scheme (hereinafter, referred to as 'DPCM compression data').

The source driver 140 drives source lines SL1 to SLm, which are connected to a display panel, with signals based on data decompressed by the decoder 130. For example, the source driver 140 applies output voltages corresponding to the decompressed data to the source lines SL1 to SLm, respectively.

As described above, the display driving device 100 compresses input image data DAT_IN using a more efficient or least error causing one of the binary encoding scheme and the DPCM encoding scheme, in this exemplary embodiment. Put more generally, the display driving device 100 compresses input image data DAT_IN using a compression scheme that causes the fewest errors, which is selected from a plurality of available compression schemes. For example, an error ratio of the more efficient encoding scheme will be lower than an error ratio of the other encoding scheme or schemes. According to aspects of the inventive concept, it is possible to reduce power consumption and interference between signals by reducing memory use in proportion to a compression ratio.

Figure 2:
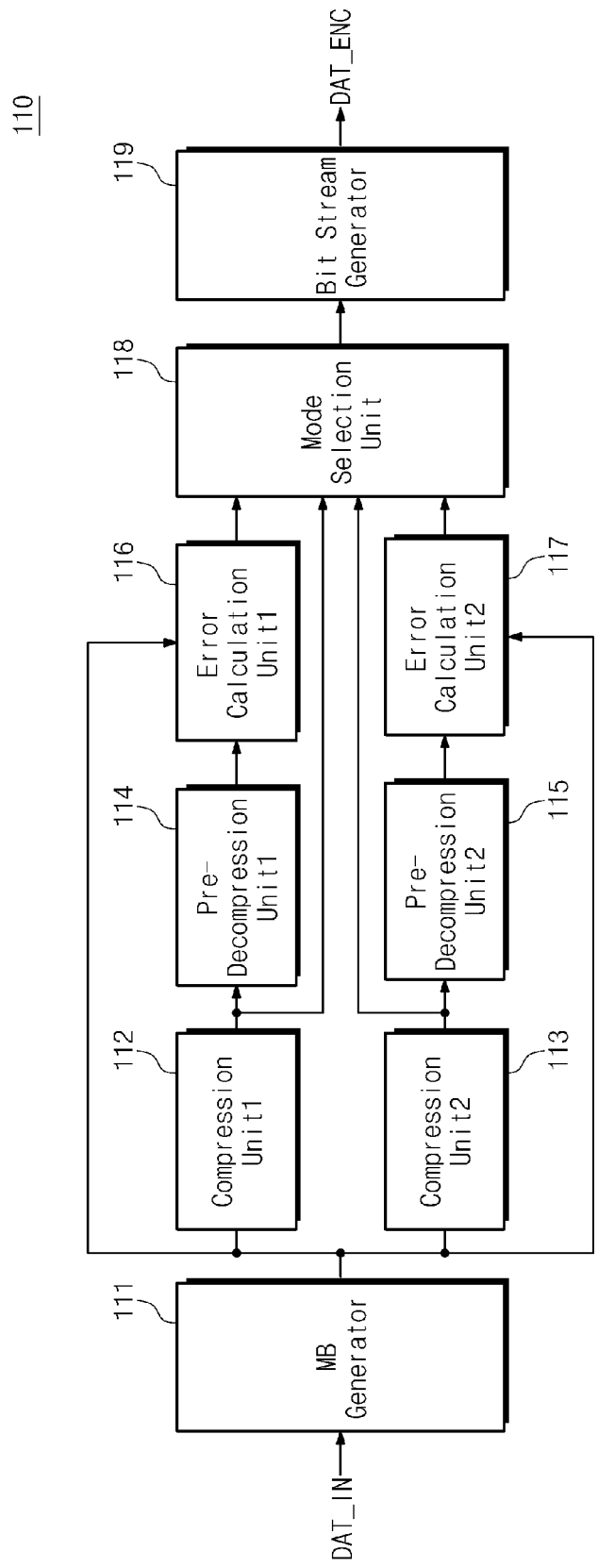
FIG. 2 is a block diagram showing an exemplary embodiment of the encoder illustrated in FIG. 1, according to aspects of the inventive concept.

FIG. 2 is a block diagram showing an embodiment of encoder 110 illustrated in FIG. 1, according to aspects of the inventive concept. Referring to FIG. 2, encoder 110 includes a macro block (MB) generator 111, a first compression unit 112, a second compression unit 113, a first pre-decompression unit 114, a second pre-decompression unit 115, a first error calculation unit 116, a second error calculation unit 117, a mode selection unit 118, and a bit stream generator 119. Although not illustrated in FIG. 2, the encoder 110 may further include elements for performing entropy encoding to improve a compression ratio. Entropy encoding is generally known in the art, so not described herein in detail.

In this embodiment, first compression unit 112, first pre-decompression unit 114, and first error calculation unit 116 form a first path. Also, second compression unit 113, second pre-decompression unit 115, and second error calculation unit 117 form a second path. And the first path and second path operate in parallel, preferably substantially simultaneously processing macro blocks from MB generator 111 in parallel using two different compression and decompression coding schemes. In other embodiments there could be more than two parallel paths (e.g., 1 to n paths, where n≥3) using more than two different coding schemes (e.g., 1 to n coding schemes, where again n≥3).

More particularly, in the exemplary embodiment, the macro block generator 111 produces macro blocks from input image data DAT_IN. A macro block (or macro-block) is a group of pixels of image data. A macro block may comprise one or more macro block units, wherein a macro block unit can be smaller than a macro block. Thus, a plurality of macro block units can make up a macro block.

In an exemplary embodiment in accordance with the inventive concept, the input image data DAT_IN may be formed into macro blocks according to a PenTile® matrix coding scheme. That is, the input image data DAT_IN may be compressed into macro blocks having a pixel structure where one pixel is formed of one R sub-pixel, two G sub-pixels, and one B sub-pixel.

The macro block generator 111 can be configured to generate a 2×2 R macro block formed of four red sub-pixel values, a 4×2 G macro block formed of eight green sub-pixel values, and a 2×2 B macro block formed of four blue sub-pixel values. This will be more fully described with reference to FIG. 3.

The first compression unit 112 compresses the macro blocks, formed from the input image data DAT_IN, on a macro block unit basis, based on a binary encoding scheme. Thus, each macro block unit is individually encoded using binary encoding, in this embodiment. This will be more fully described with reference to FIGS. 4 and 5.

Similarly, the second compression unit 113 also compresses the macro blocks, formed from the input image data DAT_IN on a macro block unit basis, but does so based on a DPCM encoding scheme. Thus, each macro block unit is individually encoded using DPCM encoding, in this embodiment. This will be more fully described with reference to FIG. 6.

The first pre-decompression unit 114 decompresses each compressed macro block unit output by the first compression unit 112 according to the binary encoding scheme, i.e., by macro block unit. The decompressed data may be obtained by performing a binary encoding operation in reverse, for example.

The second pre-decompression unit 115 decompresses each compressed macro block unit output by the second compression unit 113 according to the DPCM encoding scheme, i.e., by macro block unit. The decompressed data may be obtained by performing a DPCM encoding operation in reverse, for example.

The first error calculation unit 116 is configured to calculate a difference value between the input image data DAT_IN and macro block data compressed by the first compression unit 112 and then decompressed by the first pre-decompression unit 114, on a macro block unit basis. Below, macro block data compression performed by the first compression unit 112 and compressed macro block data decompression performed by the first pre-decompression unit 114 corresponds to a "binary mode." The difference value calculated by the first error calculation unit 116 may be referred to as a "first error."

The second error calculation unit 117 is configured to calculate a difference value between the input image data DAT_IN and macro block data compressed by the second compression unit 113 and then decompressed by the second pre-decompression unit 115, by a macro block unit. Below, macro block data compression performed by the second compression unit 113 and compressed macro block data decompression performed by the second pre-decompression unit 115 corresponds to a "DPCM mode." The difference value calculated by the second error calculation unit 117 may be referred to as a "second error."

The mode selection unit 118 is configured to select any one of the binary compression data and the DPCM compression data based on a comparison between the first error and the second error. For example, the mode selection unit 118 can select a mode, between the binary mode and the DPCM mode, corresponding to the mode having a relatively small error value among the first and second errors. The mode selection unit 118 can then output compressed data corresponding to the selected mode. If the first error is less than or identical to the second error, the mode selection unit 118 selects and outputs the binary compression data as compressed data DAT_ENC, in this example. On the other hand, if the first error is more than the second error, the mode selection unit 118 selects and outputs the DPCM compression data as compressed data DAT_ENC. The mode selection unit 118 transmits information identifying the selected mode and the compressed data corresponding to the selected mode to the bit stream generator 119.

The bit stream generator 119 is configured to generate mode data indicative of the selected mode and compressed data DAT_ENC corresponding to the selected mode, herein the binary mode or DPCM mode. At this point, the bit stream may be produced via a fixed length coding scheme. The bit stream generator 119 transmits the bit stream to a memory 120 in FIG. 1. In particular, a bit stream corresponding to the binary mode will be more fully described with reference to FIG. 5.

Figure 3:
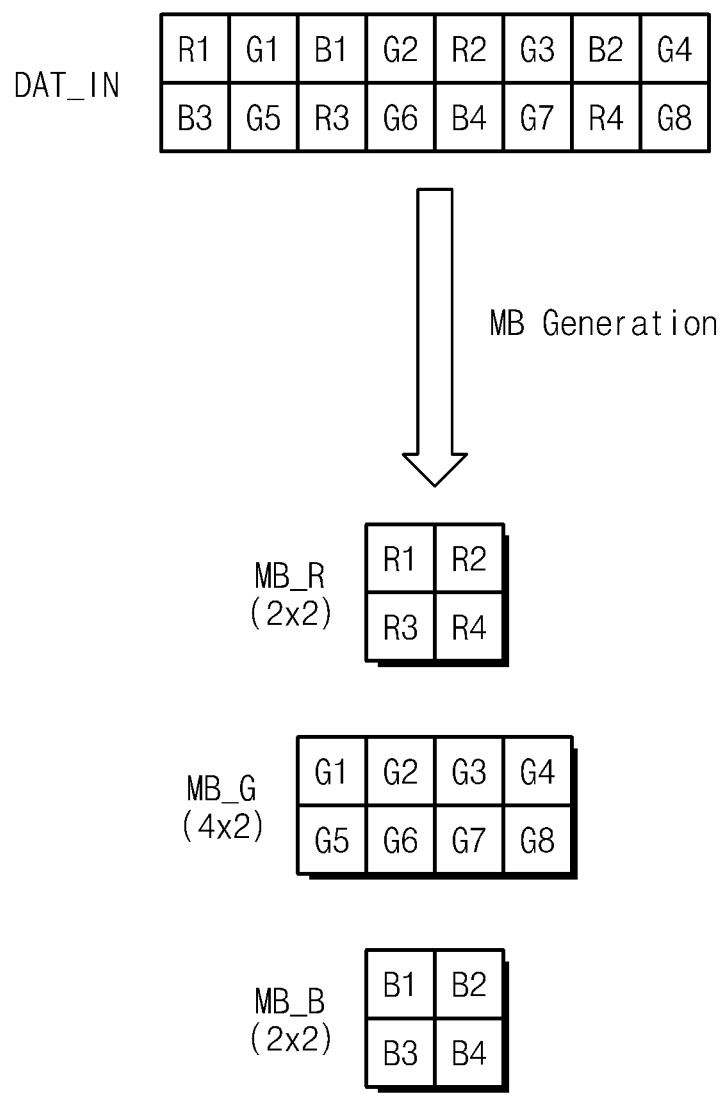
FIG. 3 is a diagram showing an exemplary embodiment of input image data and macro blocks associated therewith, according to aspects of the inventive concept.

FIG. 3 is a diagram showing an embodiment of a part of the input image data (DAT_IN) and macro blocks generated therefrom. Referring to FIG. 3, macro blocks MB_R (red), MB_G (green), and MB_B (blue) are generated from input image data DAT_IN by macro block generator 111 in FIG. 2. As illustrated in FIG. 3, the input image data DAT_IN may be formed in accordance with a PenTile® matrix coding scheme corresponding to an RGBG pixel structure.

Generation of macro blocks means that sub-pixel values R1 to R4, G1 to G8, and B1 to B4 of the input image data DAT_IN are reconfigured in corresponding color units, that is, a red unit, a green unit, and a blue unit. Since the input image data DAT_IN is configured in the PenTile® matrix coding scheme, the R and B macro blocks MB_R and MB_B are set to have a 2×2 size, and the G macro block MB_G is set to have a 4×2 size.

For example, the R macro block MB_R is formed of first to fourth sub-pixel values R1 to R4, the G macro block MB_G is formed of first to eighth sub-pixel values G1 to G8, and the B macro block MB_B is formed of first to fourth sub-pixel values B1 to B4.

Figure 4:
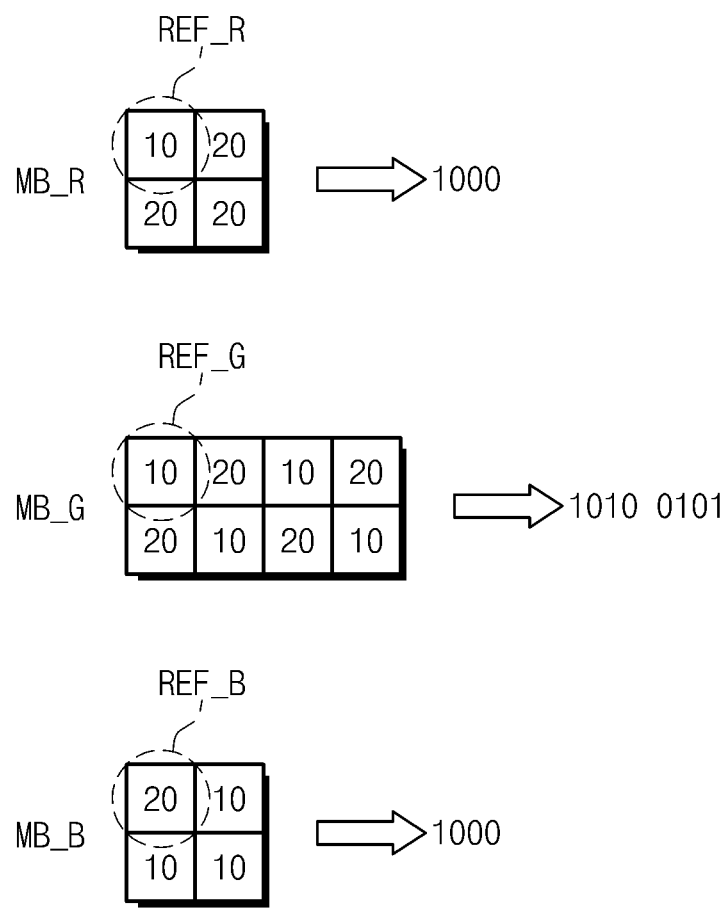
FIG. 4 is a diagram showing an exemplary embodiment of macro blocks used in a binary encoding scheme, according to aspects of the inventive concept.

FIG. 4 is a diagram showing an embodiment of macro blocks formed in accordance with a binary encoding scheme. In FIG. 4, there is illustrated an example wherein each of the sub-pixels in each macro block has one of two values, here 10 and 20. But it will be well understood that values of sub-pixels in a macro block can be determined in various other manners.

Below, a binary encoding scheme will be more fully described with reference to FIG. 4. First of all, an average value (hereinafter, referred to as 'a reference average value') of sub-pixel values is calculated with respect to each macro block to determine representative values of respective macro blocks. An upper average value and a lower average value may be calculated on the basis of the reference average value. Here, the upper average value may be determined as an average value of sub-pixel values equal to or more than the reference average value, and the lower average value is an average value of sub-pixel values that are less than the reference average value.

A first representative value may be any one of the upper and lower average values corresponding to a value of a reference sub-pixel of a macro block, and a second representative value may be the other one of the upper and lower average values. Here, a reference sub-pixel of a macro block may be defined by a sub-pixel placed at a coordinate value (0,0), as shown.

For example, representative values of the R macro block MB_R may be determined as follows. A reference average value is 17.5 ((10+20+20+20)/4), which can be determined as the sum of sub-pixel values in the macro block, divided by the number of sub-pixel values in the macro block. An upper average value is 20 ((20+20+20)/3), which is the sum of sub-pixel values having the higher value (here 20), divided by the number of sub-pixels in the macro block having that value. And a lower average value is 10 (10/1) which can be determined as the sum of sub-pixel values having the lower value (here 10), divided by the number of sub-pixels in the macro block having that value. Since a reference sub-pixel REF_R of the R macro block MB_R has a value of 10, a value of the reference sub-pixel REF_R corresponds to the lower average value. Accordingly, the lower average value of 10 is set to the first representative value, and the upper average value of 20 is set to the second representative value.

The first and second representative values of a G macro block MB_G may be determined in the same manner as the R macro block MB_R. In the G macro block MB_G, the first representative value is 10, and the second representative value is 20. The first and second representative values of the B macro block MB_B may be determined in the same manner as the R macro block MB_R. In the B macro block MB_B, the first representative value is 20, and the second representative value is 10.

A pattern of each macro block may be determined according to the first and second representative values of each macro block. A pattern component corresponding to the first representative value can be set to '1', and a pattern component corresponding to the second representative value can be set to '0'. The pattern for a macro block can be read from left to right, starting with the reference sub-pixel REF_F. With this condition, the R macro block MB_R has a pattern of '1000', the G macro block MB_G has a pattern of '10100101', and the B macro block MB_B has a pattern of '1000'.

Where a binary encoding scheme is used, input image data DAT_IN may be compressed using the first and second representative values and a pattern of each macro block can be determined in the above-described manner. An operation of generating a bit stream including the binary compression data will be more fully described with reference to FIG. 5.

FIG. 5 is a diagram showing an embodiment of a bit stream corresponding to macro blocks illustrated in FIG. 4. Referring to FIG. 5, a bit stream includes a mode data field MODE, pattern fields P_R, P_G, P_B, each corresponding to R, G, and B macro blocks, first representative value fields A_R, A_G, and A_B each corresponding to R, G, and B macro blocks, and second representative value fields B_R, B_G, and B_B, each corresponding to R, G, and B macro blocks.

The mode data field MODE includes mode data in the form of 3 bits, in this example embodiment. The mode data indicates either one of a binary mode and a DPCM mode for selection, in this example. For example, as illustrated in FIG. 5, 3-bit mode data value of 111 indicates that the bit stream includes binary compression data.

The pattern fields P_R, P_G, P_B include corresponding pattern components. At this point, since the uppermost bit of each pattern is set to the same value (for example, 1) due to the binary encoding characteristics, each of the pattern fields P_R, P_G, P_B can be set to include pattern components other than the uppermost bit, as shown in FIG. 5 for P_R, P_G, and P_B.

Each of the first representative value fields A_R, A_G, and A_B includes a first representative value in binary of a corresponding macro block, and each of the second representative value fields B_R, B_G, and B_B includes a second representative value in binary of a corresponding macro block. That is, "10" is represented as "0000 1010" and "20 is represented as "0001 1010" in FIG. 5.

A data compression ratio may be differentiated according to a bit number allotted to each field of a bit stream. The data compression ratio may increase as a bit number of a bit stream decreases.

Figure 6:
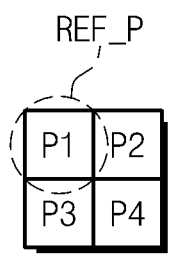
FIG. 6 is a diagram showing an exemplary embodiment of a 2×2 macro block used in a DPCM encoding scheme, according to aspects of the inventive concept.

FIG. 6 is a diagram showing an embodiment of a 2×2 macro block used in a DPCM encoding scheme. Below, a DPCM encoding scheme will be more fully described with reference to FIG. 6. In the DPCM encoding scheme, input image data DAT_IN may be compressed considering the relationship between a reference sub-pixel REF_P and remaining sub-pixels. Difference values DVAL1 to DVAL3 among quantized sub-pixel values P1 to P4 may be calculated with respect to each macro block. The difference values DVAL1 to DVAL3 indicate the relationships between a sub-pixel value P1 corresponding to the reference sub-pixel REF_P and remaining sub-pixels P2 to P4.

As illustrated in FIG. 6, a first difference value DVAL1 is obtained by subtracting a first sub-pixel value P1 (as the reference pixel REF_P) from a second sub-pixel value P2, a second difference value DVAL2 is obtained by subtracting a third sub-pixel value P3 from the first sub-pixel value P1, and a third difference value DVAL3 is obtained by subtracting the first sub-pixel value P1 from a fourth sub-pixel value P4.

Therefore, the input image data DAT_IN may be compressed using the first sub-pixel value P1 as a reference value REF_P and the difference values DVAL1 to DVAL3. Likewise, DPCM encoding on a 4×2 macro block may be made in the same manner. The DPCM encoding scheme, given those values, is well known, so a description thereof is thus omitted.

Figure 7:
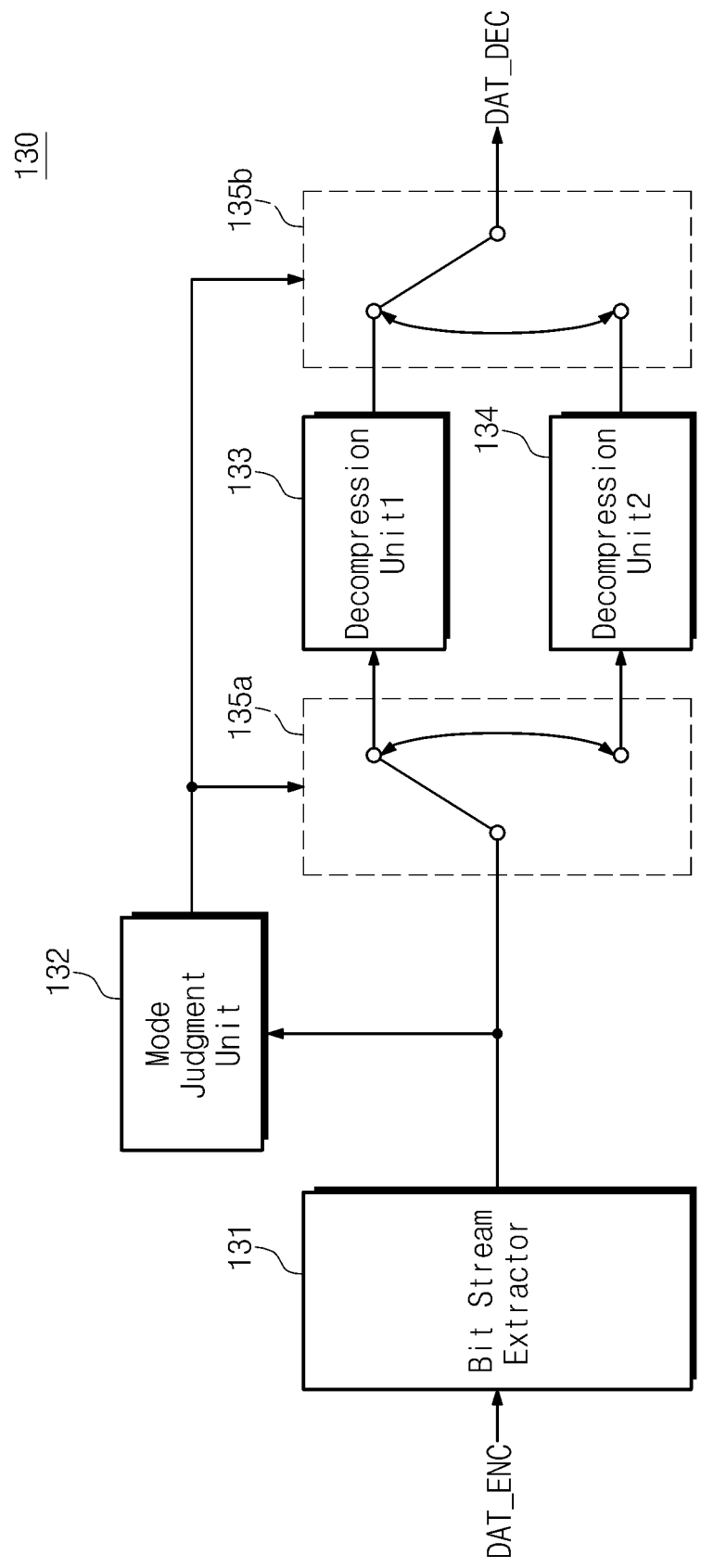
FIG. 7 is a block diagram showing an exemplary embodiment of the decoder illustrated in FIG. 1, according to aspects of the inventive concept.

FIG. 7 is a block diagram showing an embodiment of a decoder according to aspects of the inventive concept, such as decoder 130 in FIG. 1. The decoder 130 receives compressed data DAT_ENC corresponding to a selected mode and outputs decompressed image data DAT_DEC.

Referring to FIG. 7, decoder 130 includes a bit stream extractor 131, a mode judgment unit 132, a first decompression unit 133, and a second decompression unit 134.

The bit stream extractor 131 reads a bit stream from a memory, such as memory 120 in FIG. 1, and extracts mode data and compressed data from the read bit stream.

The mode judgment unit 132 determines whether the compressed data is binary compression data or DPCM compression data, based on the mode data from the bit stream extractor 131, e.g., see the MODE field in FIG. 5. Based on that determination, the mode judgment unit 132 determines a decoding scheme to be used on the compressed data output from the bit stream extractor 131. For example, based on the result of the mode judgment unit 132, the binary compression data may be transferred to the first decompression unit 133 to be decompressed, or the DPCM compression data may be transferred to the second decompression unit 134 to be decompressed.

In the exemplary embodiment, two switching units 135a and 135b are controlled by the mode judgment unit 132. For example, when the binary mode is indicated, switch 135a couples the binary compression data from bit stream extractor 131 to the first decompression unit 133. And switch 135b couples the output of the first decompression unit 133 to the output of the decoder 130. On the other hand, when the DPCM mode is indicated, switch 135a couples the DPCM compression data from the bit stream extractor 131 to second decompression unit 134. And switch 135b couples the output of the second decompression unit 134 to the output of the decoder 130.

The first decompression unit 133 decompresses the binary compression data according to the binary decoding scheme. For instance, the first decompression unit 133 performs a binary encoding operation in reverse to decompress the binary compression data by macro block unit to return to the sub-pixel values of the input image data DAT_IN before compression. The binary decoding operation may be made using the first representative values and a pattern of each macro block.

The second decompression unit 134 decompresses the DPCM compression data according to the DPCM decoding scheme. For instance, the second decompression unit 134 performs a DPCM encoding operation in reverse to decompress the DPCM compression data by macro block unit to return to the sub-pixel values of the input image data DAT_IN before compression. The DPCM decoding operation is well known, and description thereof is thus omitted.

With the above-described DPCM compression and decompression, as compared with compression and decompression performed using sub-pixel values of a peripheral macro block, data error propagation can be prevented by making compression and decompression using one of the sub-pixel values in a macro block to be compressed and decompressed. As a result, it is possible to minimize an artifact phenomenon due to data error propagation.

The decoder 130 provides a source driver 140 in FIG. 1 with data DAT_DEC, which is decompressed image data output by the selected one of the first and second decompression units 133 and 134. Source driver 140, in turn, drives a display panel, see for example FIGS. 1 and 10.

Figure 8:
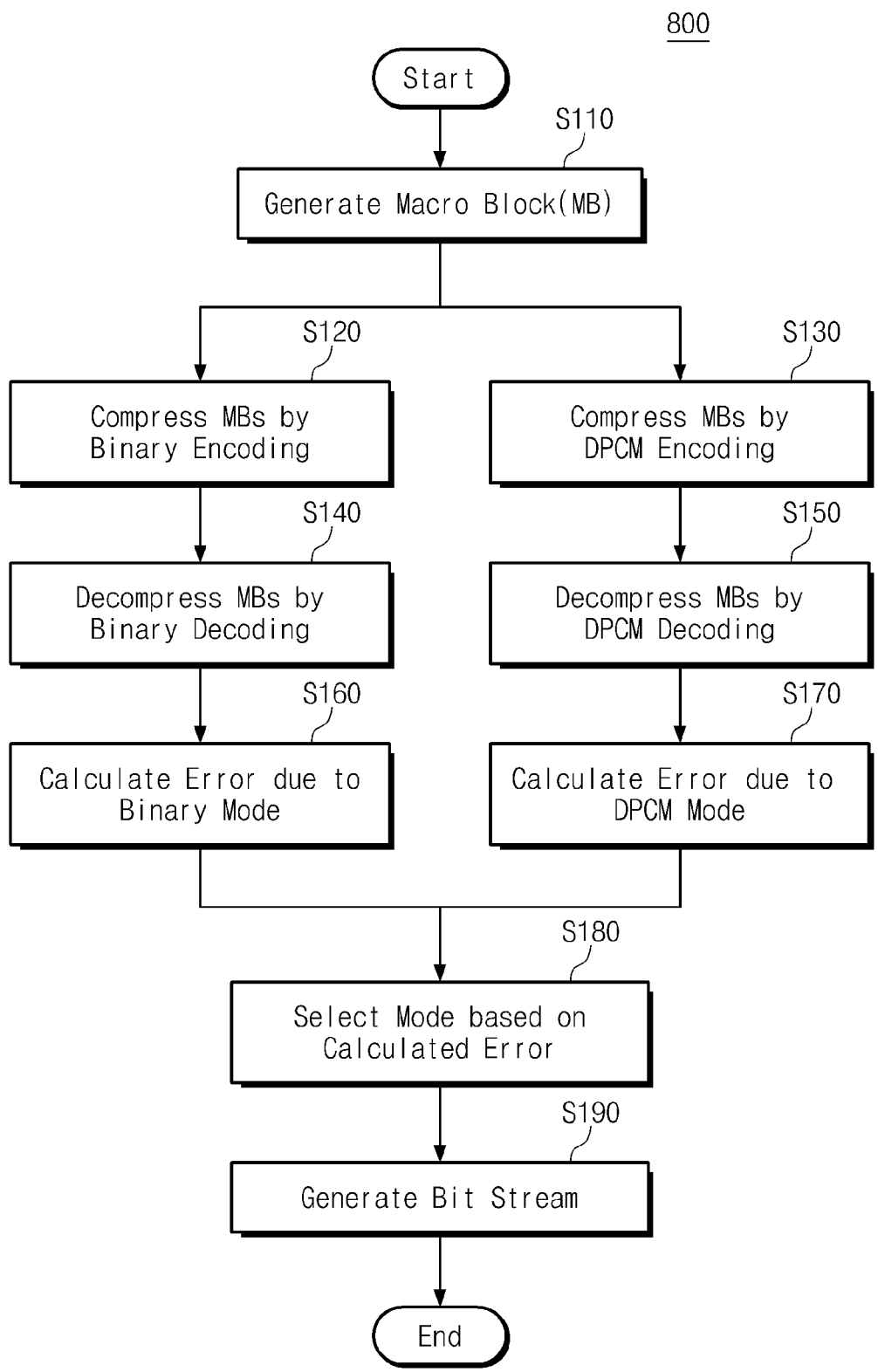
FIG. 8 is a flowchart for describing an exemplary embodiment of an image data compression method, according to aspects of the inventive concept.

FIG. 8 is a flowchart for describing an embodiment of an image data compression method 800, according to aspects of the inventive concept. Method 800 can, for example, be carried out by the encoder 120 of FIGS. 1 and 2.

Referring to FIG. 8, in step S110, macro blocks are generated by macro block generator 111 from the input image data DAT_IN. That is, the macro blocks each corresponding to RGB colors are generated. Where the input image data is formed in a PenTile® matrix coding scheme, R and B macro blocks have a 2×2 size, and a G macro block has a 4×2 size.

In step S120, the input image data DAT_IN is compressed by macro block unit according to a binary encoding scheme by first compression unit 112. That is, binary compression data is generated from the input image data DAT_IN. At this point, representative values and patterns of respective macro blocks are used.

In step S130, the input image data DAT_IN is compressed by macro block unit according to a DPCM encoding scheme by second compression unit 113. That is, DPCM compression data is generated from the input image data DAT_IN. At this point, the relationships among a reference sub-pixel REF_P and remaining sub-pixels of respective macro blocks are used. For example, difference values between a value of a reference sub-pixel and values of remaining sub-pixels are used, as discussed above.

In step S140, the binary compression data is decompressed by macro block unit according to a binary decoding scheme, by first pre-decompression unit 114.

In step S150, the DPCM compression data is decompressed by macro block unit according to a DPCM decoding scheme, by second pre-decompression unit 115.

In step S160, a first error due to the binary mode operation is calculated by first error calculation unit 116. That is, a difference value between the input image data DAT_IN and data sequentially experiencing binary compression and decompression is calculated with respect to respective macro blocks. Errors can be calculated in any known manner of image data comparison. For example, pixel values from the input image data DAT_IN can be compared to corresponding pixel values in the decompressed binary compression data.

In step S170, a second error due to the DPCM mode operation is calculated by first error calculation unit 116. That is, a difference value between the input image data DAT_IN and data sequentially experiencing DPCM compression and decompression is calculated with respect to respective macro blocks. Errors can be calculated in any known manner of image data comparison, and in the same manner performed for the binary mode data. For example, pixel values from the input image data DAT_IN can be compared to corresponding pixel values in the decompressed DPCM compression data.

In step S180, one of the binary mode and the DPCM mode is selected according to the calculated first and second errors. For example, where an error due to the binary mode operation is identical to or less than an error due to the DPCM mode operation, the binary mode is selected. On the other hand, where an error due to the binary mode operation is more than an error due to the DPCM mode operation, the DPCM mode is selected. This can be performed by the mode selection unit 118.

In step S190, a bit stream is generated which includes mode data indicating a selected mode and compressed data corresponding to the selected mode, by bit stream generator 119.

The above-described operations S110 to S190 are repeated until data compression is completed with respect to all macro blocks constituting the input image data DAT_IN. Therefore, compression and decompression schemes can be different for different macro blocks generated from the input image data DAT_IN.

Figure 9:
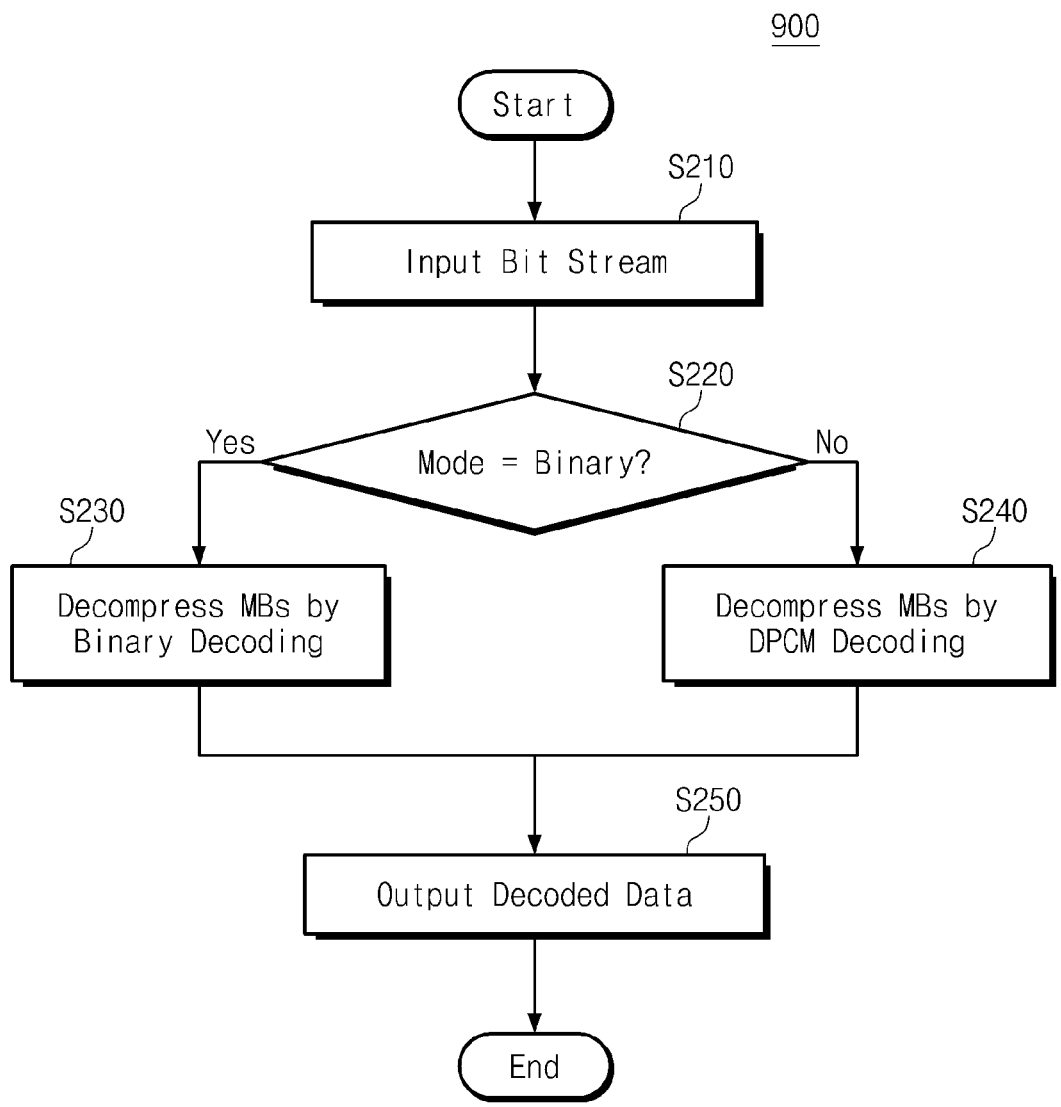
FIG. 9 is a flowchart for describing an exemplary embodiment of an image data decompression method, according to aspects of the inventive concept.

FIG. 9 is a flowchart for describing an embodiment of an image data decompression method 900, according to aspects of the inventive concept. Method 900 can, for example, be carried out by the decoder 130 of FIGS. 1 and 7.

Referring to FIG. 9, in step S210, a bit stream is received, including mode data and compressed data. In step S220, it is determined whether the compressed data is binary compression data or DPCM compression data, based on the mode data.

If the compressed data is determined to be the binary compression data, the method proceeds to step S230, in which the binary compression data is decompressed according to a binary decoding scheme using first and second representative values and patterns of respective macro blocks.

If the compressed data is determined to be the DPCM compression data, the method proceeds to step S240, in which the DPCM compression data is decompressed according to a DPCM decoding scheme using a reference sub-pixel value and difference values associated therewith.

In step S250, data decompressed according to one of the binary decoding scheme and the DPCM decoding scheme is transmitted to a source driver 140 in FIG. 1.

The above-described operations S210 to S250 are repeated until data decompression is completed with respect to all macro blocks constituting the input image data DAT_IN.

Figure 10:
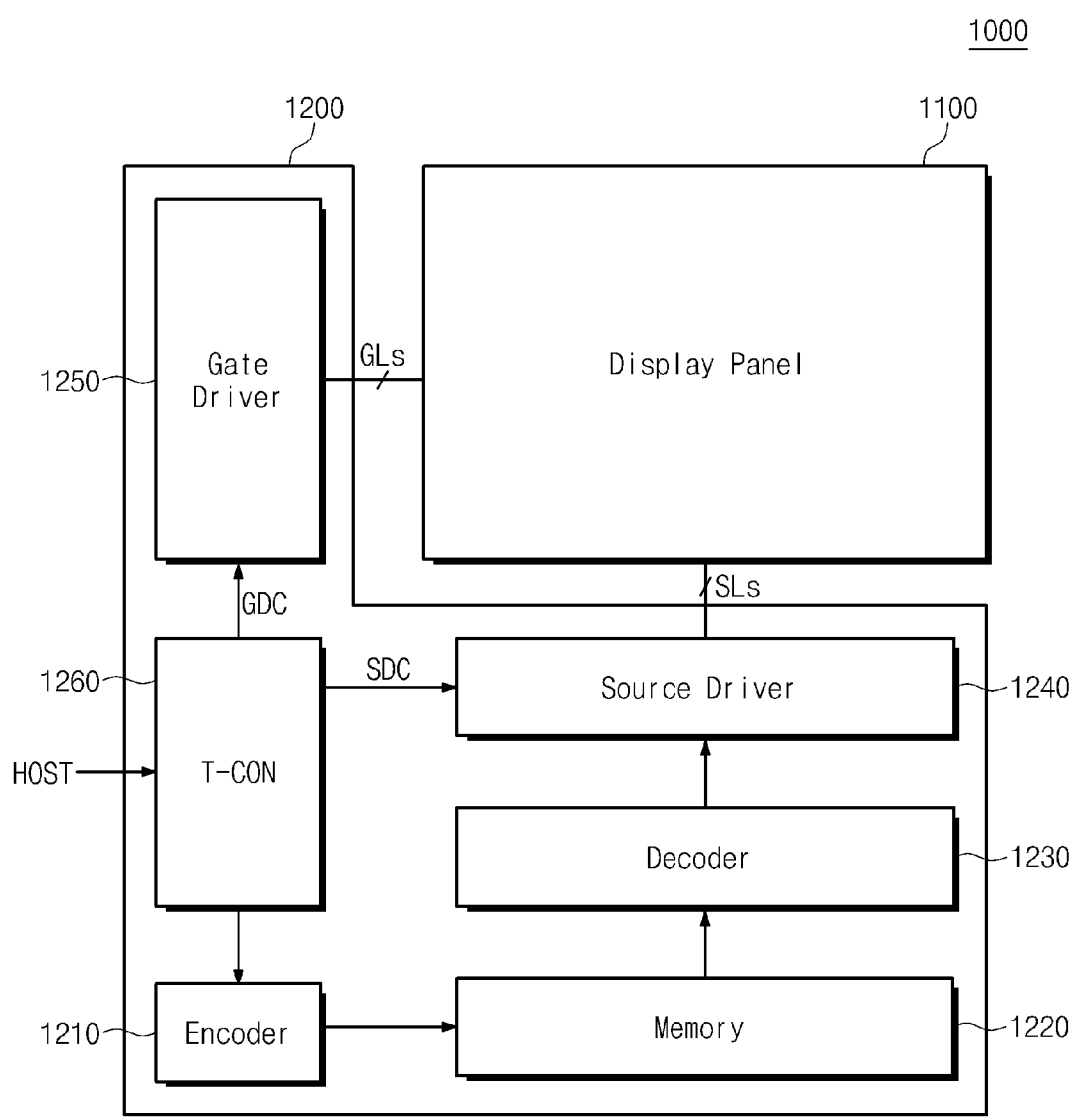
FIG. 10 is a block diagram showing one exemplary embodiment of a display device including a display driving device, according to aspects of the inventive concept.

FIG. 10 is a block diagram showing one exemplary embodiment of a display device including a display driving device according to aspects of the inventive concept.

Referring to FIG. 10, display device 1000 includes a display panel 1100 and a display driving device 1200.

The display panel 1100 is connected with the display driving device 1200 via source lines and gate lines. The display panel 1100 includes a plurality of pixels arranged in a matrix form of rows and columns. Each pixel is connected with a corresponding gate line and a corresponding source line.

In some embodiments, the display panel 1100 may include pixels arranged according to a PenTile® matrix coding scheme.

The display driving device 1200 includes an encoder 1210, a memory 1220, a decoder 1230, a source driver 1240, a gate driver 1250, and a timing controller 1260.

The encoder 1210 is configured to select any one of a binary encoding scheme and a DPCM encoding scheme and to compress input image data transferred from the timing controller 1260 according to the selected encoding scheme. At this point, the encoder 1210 selects the encoding scheme causing less of an error between the binary encoding scheme and the DPCM encoding scheme.

The memory 1220 stores data compressed by the encoder 1210. That is, the memory 1220 stores data compressed using the binary encoding scheme or data compressed using the DPCM encoding scheme. The memory 1220 transmits the compressed data to the decoder 1230, or otherwise makes the compressed data available to the decoder 1230.

The decoder 1230 decompresses the compressed data using a selected one of a binary decoding scheme and a DPCM decoding scheme.

The source driver 1240 provides the source lines with output voltages corresponding to data decompressed by the decoder 1230, in response to a source driving control signal SDC from the timing controller 1260.

The gate driver 1250 applies a gate voltage to the gate lines sequentially in response to a gate driving control signal GDC from the timing controller 1260.

The timing controller 1260 receives a vertical sync signal, a horizontal sync signal, and input image data from a host (not shown). The timing controller 1260 generates the source driving control signal SDC and the gate driving control signal GDC in response to the vertical and horizontal sync signals from the host. The timing controller 1260 transmits the source driving control signal SDC to the source driver 1240 and the gate driving control signal GDC to the gate driver 1250. The timing controller 1260 transmits the input image data to the encoder 1210.

As described above, the display driving device 1200 is configured to compress the input image data using a relatively efficient encoding scheme, in this embodiment chosen between at least the binary encoding scheme and the DPCM encoding scheme.

Figure 11:
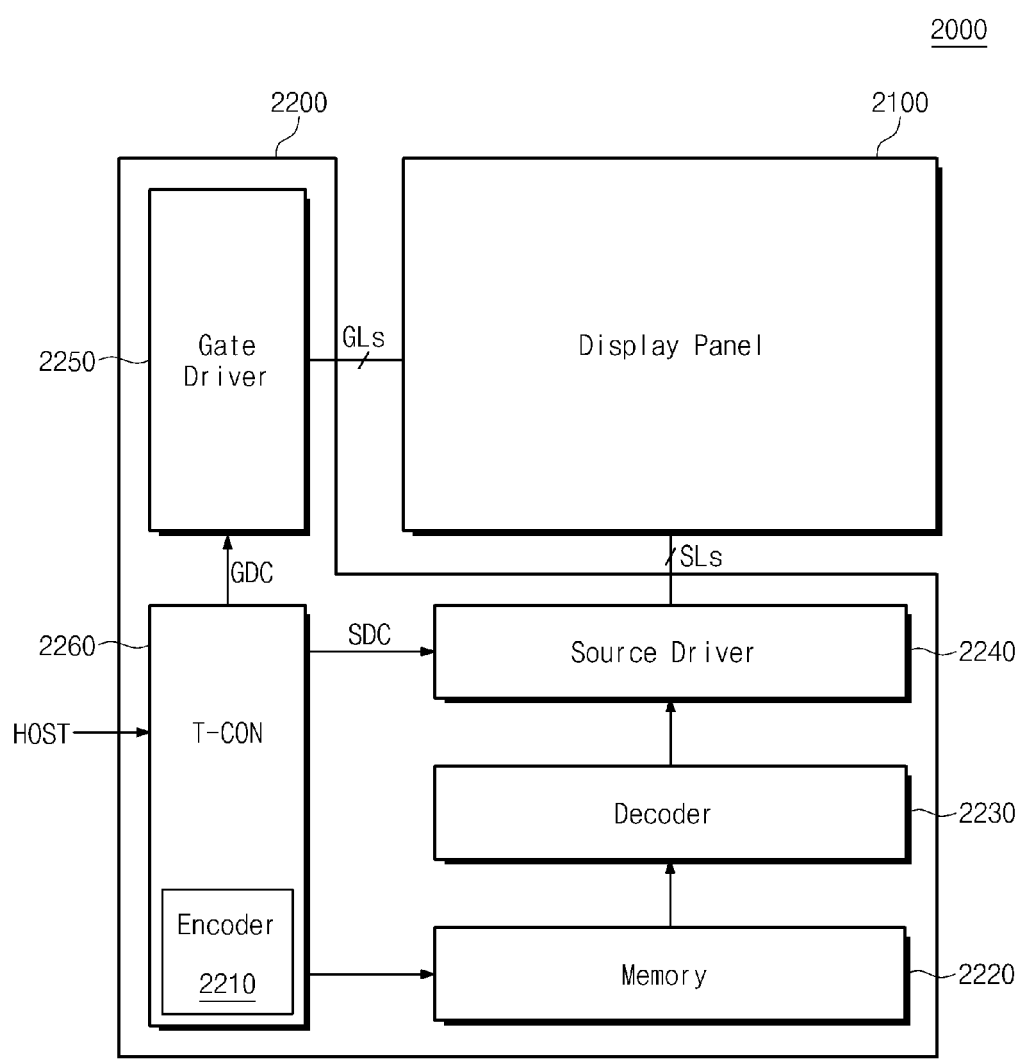
FIG. 11 is a block diagram showing another exemplary embodiment of a display device including a display driving device, according to aspects of the inventive concept.

FIG. 11 is a block diagram showing another exemplary embodiment of a display device including a display driving device, according to aspects of the inventive concept.

Referring to FIG. 11, a display device 2000 includes a display panel 2100 and a display driving device 2200. The display driving device 2200 includes an encoder 2210, a memory 2220, a decoder 2230, a source driver 2240, a gate driver 2250, and a timing controller 2260.

The timing controller 2260 includes the encoder 2210, which compresses input image data and provides compressed data to the memory 2220. The display device 2000 in FIG. 11 is substantially identical to that in FIG. 10 except for the above-described difference, and description thereof is thus omitted.

The above-disclosed subject matter is to be considered illustrative, and not restrictive, of the inventive concept. It is understood that various modifications can be made therein and that the inventive concept may be implemented in various forms and embodiments, and that they may be applied in numerous applications, only some of which have been described herein. The appended claims are intended to cover all such modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A display driving device comprising:
an encoder configured to receive input image data and to output compressed data using a selected binary or differential pulse code modulation (DPCM) encoding scheme, wherein the encoder comprises:
a macro block generator configured to generate macro blocks according to a PenTile® coding matrix from the input image data, the macro blocks having a pixel structure where one pixel is formed of one red (R) sub-pixel formed as a 2×2 macro block having four R sub-pixel values, two green (G) sub-pixels formed as a 4×2 macro block having eight G sub-pixel values, and one blue (B) sub-pixel formed as a 2×2 macro block having four B sub-pixel values;
a first set of units configured to compress the macro blocks using the binary encoding scheme to produce binary compression data, then decompress the binary compression data, and then calculate a first error with respect to the input image data;
a second set of units configured to compress the macro blocks using the DPCM encoding scheme to produce DPCM compression data, then decompress the DPCM compression data, and then calculate a second error with respect to the input image data; and
a mode selection unit configured to output one of the binary compression data and the DPCM compression data as the output compressed data based on the lesser of the first and second errors;
a decoder configured to decompress the output compressed data using a decoding scheme corresponding to the selected encoding scheme to form decompressed data; and
a source driver configured to drive source lines coupled to a display panel based on the decompressed data.

2. The display driving device of claim 1, wherein the encoder comprises:
   the macro block generator configured to generate macro blocks from the input image data, the macro blocks comprising macro block units;
   a first compression unit configured to compress the input image data by macro block unit using the binary encoding scheme to produce macro block units of the binary compression data; and
   a second compression unit configured to compress the input image data by macro block unit using the DPCM encoding scheme to produce macro block units of the DPCM compression data.

3. The display driving device of claim 2, wherein the encoder further comprises:
   a first pre-decompression unit configured to decompress the macro block units of the binary compression data using a binary decoding scheme, by macro block unit;
   a second pre-decompression unit configured to decompress the macro block units of the DPCM compression data using a DPCM decoding scheme, by macro block unit;
   a first error calculation unit configured to calculate the first error between the input image data and the data decompressed by the first pre-decompression unit; and
   a second error calculation unit configured to calculate the second error between the input image data and the data decompressed by the second pre-decompression unit.

4. The display driving device of claim 3, wherein the encoder further comprises:
   a bit stream generator configured to generate a bit stream from the binary or DPCM compression data selected by the mode selection unit and to output the bit stream as the compressed data.

5. The display driving device of claim 4, wherein the bit stream comprises mode data indicating an encoding scheme of the binary or DPCM compression data selected by the mode selection unit.

6. The display driving device of claim 5, wherein the decoder comprises:
   a bit stream extractor configured to receive the bit stream; and
   a mode judgment unit configured to determine a decoding scheme corresponding to the binary or DPCM compression data selected by the mode selection unit based on the mode data of the received bit stream.

7. The display driving device of claim 6, wherein the decoder further comprises:
   a first decompression unit and a second decompression unit configured to selectively operate in response to a determination result of the mode judgment unit, wherein:
   the first decompression unit is configured to decompress the binary compression data by macro block unit according to a binary decoding scheme in response to the determination result of the mode judgment unit; and
   the second decompression unit is configured to decompress the DPCM compression data by macro block unit according to a DPCM decoding scheme in response to the determination result of the mode judgment unit.

8. The display driving device of claim 2, wherein the first compression unit is configured to determine first and second representative values and a pattern based on each macro block and to compress sub-pixel values of each macro block using the first and second representative values and the pattern.

9. The display driving device of claim 2, wherein the second compression unit is configured to calculate difference values between a reference sub-pixel value and remaining sub-pixel values of each macro block and to compress sub-pixel values of each macro block using the difference values.

10. An image data compression method of a display driving device, the method comprising:
    generating macro blocks from input image data, the macro blocks comprising macro block units, including generating macro blocks according to a PenTile® coding matrix from the input image data, the macro blocks having a pixel structure where one pixel is formed of one red (R) sub-pixel formed as a 2×2 macro block having four R sub-pixel values, two green (G) sub-pixels formed as a 4×2 macro block having eight G sub-pixel values, and one blue (B) sub-pixel formed as a 2×2 macro block having four B sub-pixel values;
    compressing the macro blocks of the input image data in a binary encoding scheme, by macro block unit, to produce of binary compression data and then decompressing the binary compression data;
    compressing the macro blocks of the input image data in a differential pulse code modulation (DPCM) encoding scheme, by macro block unit, to produce DPCM compression data, then decompressing the DPCM compression data;
    calculating a first error by comparing the decompressed binary compression data to the input image data;
    calculating a second error by comparing the decompressed DPCM compression data to the input image data;
    selecting data compressed according to one of the binary encoding scheme and the DPCM encoding scheme based on the lesser of the first error and the second error;
    decompressing the selected binary or DPCM compression data to form decompressed data; and
    driving source lines connected with a display panel based on the decompressed data.

11. The image data compression method of claim 10, wherein compressing the macro blocks of the input image data in a binary encoding scheme by macro block unit comprises:
    determining first and second representative values representing sub-pixel values of each macro block;
    determining a pattern of each macro block based on the first and second representative values; and
    compressing sub-pixel values of each macro block using the first and second representative values and the pattern.

12. The image data compression method of claim 11, wherein determining the first and second representative values representing sub-pixel values of each macro block comprises:
    calculating an average value of the sub-pixels as a reference average value;
    calculating an average value of sub-pixel values equal to or more than the reference average value as an upper average value;
    calculating an average value of sub-pixel values less than the reference average value as a lower average value; and
    determining one of the upper and lower average values as the first representative value and the other as the second representative value, wherein the first representative value corresponds to a value of a reference sub-pixel for each macro block.

13. The image data compression method of claim 10, further comprising:
    generating a bit stream that includes mode data indicating the selected encoding scheme of the input image data and includes data compressed according to the selected encoding scheme of the input image data.

* * * * *